United States Patent
Corfitsen

(10) Patent No.: US 9,873,409 B2
(45) Date of Patent: Jan. 23, 2018

(54) METHOD AND DEVICE FOR REPLACEMENT OF A BATTERY IN A VEHICLE

(71) Applicant: Sten Corfitsen, Stockholm (SE)

(72) Inventor: Sten Corfitsen, Stockholm (SE)

(*) Notice: Subject to any disclaimer, the term of this patent is extended or adjusted under 35 U.S.C. 154(b) by 0 days.

(21) Appl. No.: 14/392,192

(22) PCT Filed: Jun. 24, 2014

(86) PCT No.: PCT/SE2014/050780
§ 371 (c)(1),
(2) Date: Dec. 23, 2015

(87) PCT Pub. No.: WO2014/209208
PCT Pub. Date: Dec. 31, 2014

(65) Prior Publication Data
US 2016/0221543 A1    Aug. 4, 2016

(30) Foreign Application Priority Data
Jun. 25, 2013  (SE) ..................... 1350769

(51) Int. Cl.
*B60S 5/06* (2006.01)
*B60L 11/18* (2006.01)
(Continued)

(52) U.S. Cl.
CPC ............. *B60S 5/06* (2013.01); *B60K 1/04* (2013.01); *B60L 11/1822* (2013.01);
(Continued)

(58) Field of Classification Search
CPC ....... B60L 11/1822; B60S 5/06; Y02T 90/124
See application file for complete search history.

(56) References Cited

U.S. PATENT DOCUMENTS 8,660,692 B2 * 2/2014 Miao ................. B60S 5/06
180/65.1
2013/0104361 A1  5/2013 Corfitsen
(Continued)

FOREIGN PATENT DOCUMENTS

EP    2 340 951 A2    7/2011
EP    2 231 447 B1    11/2011
(Continued)

OTHER PUBLICATIONS

International Search Report, dated Sep. 26, 2014, from corresponding PCT application.
(Continued)

*Primary Examiner* — Anna Momper
*Assistant Examiner* — Mark Hageman
(74) *Attorney, Agent, or Firm* — Young & Thompson

(57) ABSTRACT

Device for battery replacement in a vehicle with a storage space for a battery, which device includes a battery transporting device which is installed at least partly above ground and which is associated with a width direction and a horizontal depth direction which is perpendicular to the width direction, wherein the device is arranged to sense a position of the storage space. The transporting device includes a first pushing device and a second pushing device, which first pushing device displaces the second pushing device and which second pushing device supports the battery, the first pushing device is displaceable in the depth direction, and the second pushing device, in relation to the first pushing device, is both displaceable in the width direction and pivotable in relation to the supporting plane of the first pushing device. Also disclosed is a method for battery replacement using such a device.

20 Claims, 3 Drawing Sheets

Figure 1A:
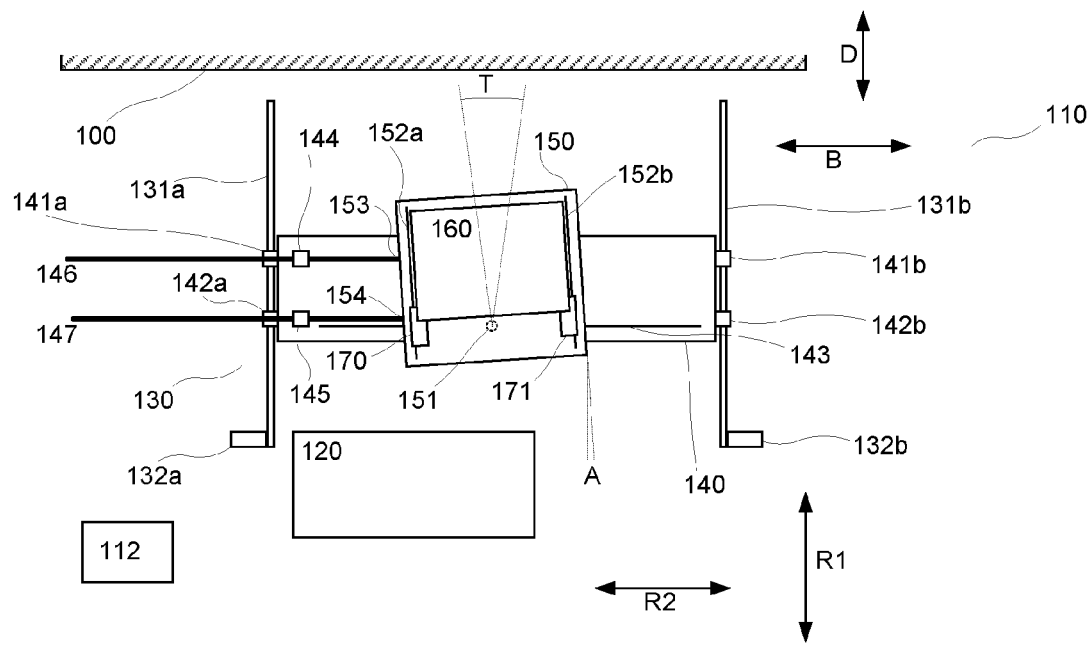

(51) Int. Cl.
*B65G 47/57* (2006.01)
*B65G 65/00* (2006.01)
*B65G 65/02* (2006.01)
*B60K 1/04* (2006.01)

(52) U.S. Cl.
CPC ........... *B65G 47/57* (2013.01); *B65G 65/005* (2013.01); *B65G 65/02* (2013.01); *B60K 2001/0461* (2013.01); *B60K 2001/0488* (2013.01); *B60K 2001/0494* (2013.01); *Y02T 10/7005* (2013.01); *Y02T 10/7072* (2013.01); *Y02T 90/124* (2013.01); *Y02T 90/14* (2013.01)

(56) References Cited

U.S. PATENT DOCUMENTS

2014/0360011 A1* 12/2014 Mulato .................... B60S 5/06
  29/729
2015/0129337 A1   5/2015 Corfitsen
2015/0151723 A1*  6/2015 Yang ..................... G05B 19/05
  414/331.09

FOREIGN PATENT DOCUMENTS

| | | |
|---|---|---|
| FR | 2 737 694 A1 | 2/1997 |
| FR | 2 749 547 A1 | 12/1997 |
| SE | 1 050 656 A1 | 12/2011 |
| SE | 1 250 388 A1 | 10/2013 |
| WO | 2005/035288 A2 | 4/2005 |
| WO | 2012/093233 A1 | 7/2012 |
| WO | WO2015/045981 * | 9/2014 |

OTHER PUBLICATIONS

European Search Report issued in Application No. 14817535.9, dated Mar. 29, 2017.

* cited by examiner

METHOD AND DEVICE FOR REPLACEMENT OF A BATTERY IN A VEHICLE

BACKGROUND OF THE INVENTION

The present invention relates to a method for replacing one or more batteries in a battery-powered vehicle, as well as a device for automatically performing such a battery replacement.

DESCRIPTION OF THE RELATED ART

A system is previously known for replacement of electric batteries for cars, for example from EP 2231447 B1. In such systems, after the car has been driven up on a ramp similar to those used for greasing pits, an arrangement emerges beneath the car and replaces a discharged battery with a new one, from below. This solution requires that the battery replacement device is buried in the floor and/or that the car is raised up substantially, which is a considerable disadvantage because such a facility, in addition to being expensive, also is bulky and therefore difficult to integrate into existing infrastructure such as gas stations. Moreover, it is difficult to provide such equipment outdoors, especially in the open air, due to problems with contamination and so on.

Furthermore, EP 2340951 A2 describes a device for, in a vehicle, receiving and accommodating a battery entering the vehicle from below, vertically upwards. This device can be used with a system as described in EP 2231447 B1, above.

It is also known, from SE 1050656 A1 and SE 1250388, to replace batteries in vehicles by bringing batteries in and out, respectively, through both a vertically disposed door in the car's vertical side and through a horizontally disposed door in the car's undercarriage. Therein, a device is described comprising a support plane which is displaceable in the longitudinal direction of the vehicle and is arranged to act along the width of the vehicle. To compensate for an angle difference between the device and the vehicle, the base of the plane is rotatable in the horizontal plane.

SUMMARY OF THE INVENTION

The present invention offers a system which is arranged above ground, which automatically and reliably can replace batteries in a vehicle, and which in a better way compensates for an inaccurate location of the vehicle in relation to the system, especially when handling heavy batteries with a total weight of for example at least 100 kg.

Hence, the invention relates to a device for battery replacement in a vehicle, which vehicle is arranged with a storage space arranged to receive and accommodate a battery for use in movement operation of the vehicle, which device comprises a transporting device arranged at least partially above ground, arranged for the automatic transport of a first battery out of and away from the storage space and a second battery up to and into the storage space, wherein the transporting device is associated with a horizontal width direction, substantially parallel to the parked vehicle's longitudinal direction, and a horizontal depth direction, which is perpendicular to the width direction, wherein the device is arranged to sense a position for the storage space in relation to the transporting device, wherein the transporting device comprises a first pushing device, which is displaceable in a first direction, and a second pushing device, which is displaceable in a second direction, said first pushing device being arranged, when displaced in the first direction, to bring with it the second pushing device in the first direction, and the second pushing device being arranged to support the battery, and is characterized in that a horizontal projection of the first direction is parallel to the depth direction, in that a horizontal projection of the second direction is parallel to the width direction, in that the second pushing device is pivotable in relation to the first pushing device in a plane spanned by the first and second directions, in that the device comprises means for adjusting the angular position of the second pushing device and its position in the second direction, in relation to the first pushing device, as well as means for displacing the first pushing device in the first direction towards the vehicle, so that the battery which is supported by the second pushing device thereby is brought to the storage space.

The invention also relates to a method for battery replacement using such a device.

BRIEF DESCRIPTION OF THE DRAWING FIGURES

Figure 1B:
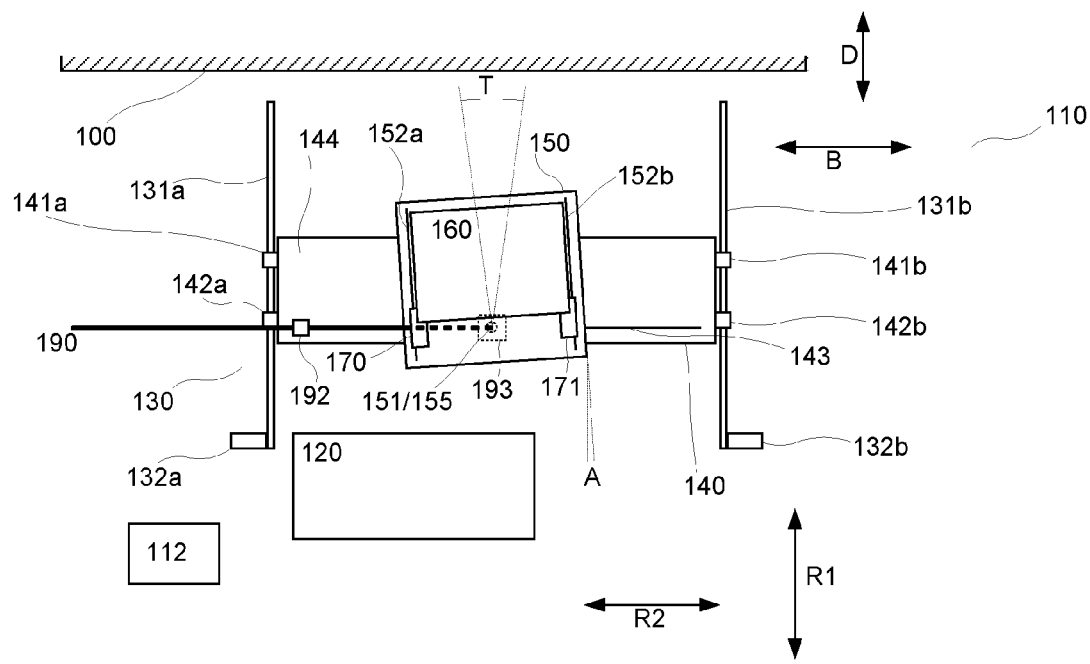
Figure 2A:
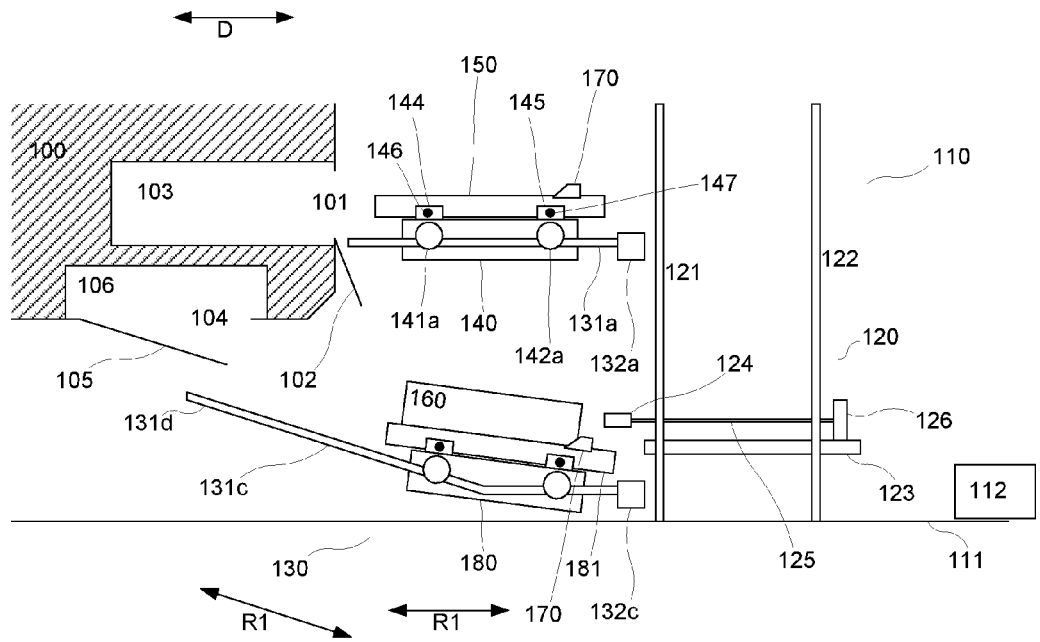
Figure 2B:
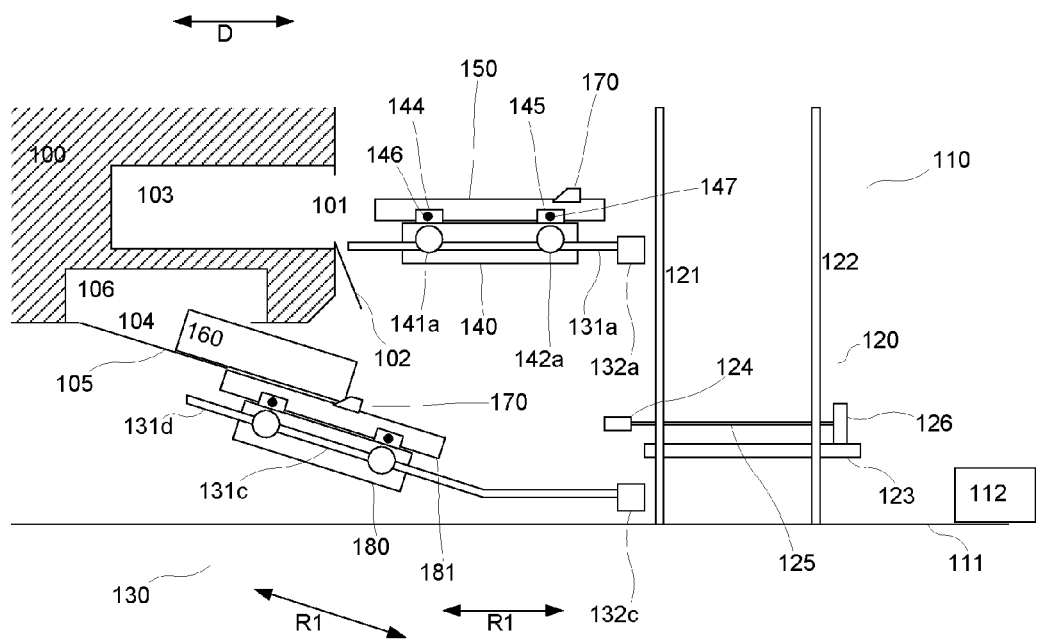
Figure 3:
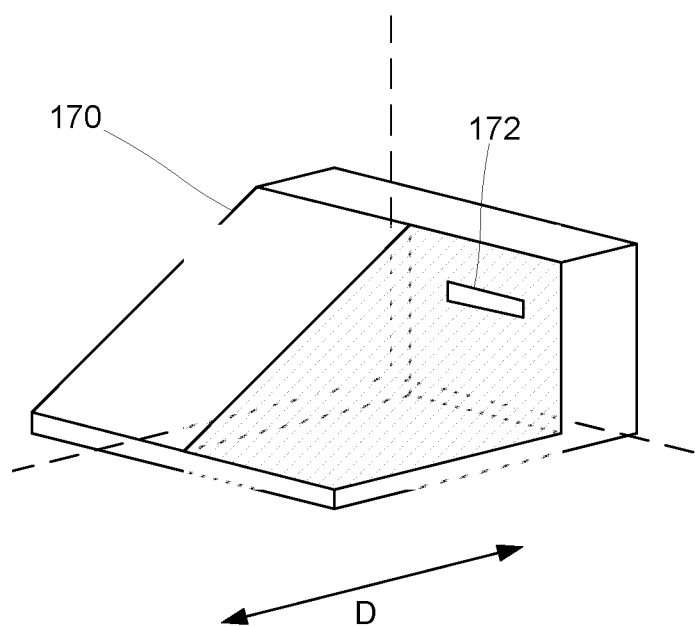

The invention will now be described in detail, with reference to exemplary embodiments of the invention and to the accompanying drawings, wherein:

FIGS. 1a and 1b illustrate two different alternative embodiments of a device according to the present invention, as seen from above;

FIGS. 2a and 2b partially illustrate the device of FIG. 1a from the side, where a pushing device 180 is disposed in two respective positions; and FIG. 3 shows a pusher according to the invention.

DETAILED DESCRIPTION OF THE INVENTION

All figures share the same reference numerals for corresponding parts. In FIGS. 1a and 1b, the rail 131c is not shown with corresponding carriages 180, 181, and in FIGS. 1a and 1b, the battery 160 is arranged on the pushing device 150 (see below).

A vehicle 100 is equipped with a storage space 103 alternatively 106 (see FIG. 2) for a battery 160, which storage space 103, 106 is arranged to receive and accommodate the battery 160, which battery 160 in terms of capacity is adapted for use in movement operation of the vehicle, in other words the vehicle 100 uses energy from the battery for its forward propulsion.

A device 110 according to the present invention for battery replacement in the vehicle 100, as well as in other, similar, vehicles, is also shown in the figures, which device 110 comprises a transporting device 130 which is at least partially, and preferably substantially completely, installed above ground 111, and which is arranged to automatically transport a first battery out and away from the storage space 103, 106, as well as a second battery 160 up to and into the storage space 103, 106. Typically, the first battery is a discharged battery, and the second battery is a fully charged battery of the same or equivalent type, which will replace the discharged battery for further operation of the vehicle 100. In the figures, the illustrated battery 160 is the second battery.

The transporting device 110 is associated with a horizontal width direction B, which is substantially parallel to the longitudinal direction of the parked vehicle 100, and a horizontal depth direction D, which is perpendicular to the width direction B.

The device 110 is arranged with as such conventional means (not shown) for sensing a position of the storage space 103, 106 in relation to the transporting device 110. Such means may for example be comprised by optical means, possibly image processing means, which optionally cooperate with optical markers attached at predetermined positions on the vehicle 100, or by interacting signaling means of transponder type, arranged both on the vehicle 100 and on the device 110. It is noted that the sensing means, in the exemplifying case in which they consist of an imaging device in the device 110 whose digital output image is processed for identification of certain characteristic parts of the vehicle, does not necessarily require special means mounted on the vehicle 100. What is important is that the sensing means enable the device 110 to determine a relative position between an opening 101, 104 of the vehicle 100 storage space 103, 106 and the transporting device 130, so that the movement of the battery to and from the storage space 103, 106 can automatically take place to and from the correct position.

The transporting device 130 comprises a first pushing device 140, which is displaceable in a first direction R1, and a second pushing device 150, which is displaceable in a second direction R2. When the first pushing device 140 is displaced in the first direction R1, it is arranged to bring with it the second pushing device 150 in the first direction R1. Thus, the two pushing devices 140, 150 are arranged to engage with each other. The second pushing device 150 is in turn arranged to support the battery 160.

According to the invention, a horizontal projection of the first direction R1 is parallel to the depth direction D. This is shown particularly clearly in FIGS. 2a and 2b, from which it can be seen that the first direction R1 can be sloped or straight in relation to the horizontal plane, or both sloped and straight along different sections of the first path of the first pushing device 140 (as in FIGS. 2a and 2b), as long as the horizontal projection of the direction R1 is parallel to the depth direction D, so that the first pushing device can be displaced in a direction substantially towards and away from, respectively, the side of the vehicle 100. Correspondingly, a horizontal projection of the second direction R2 is parallel to the width direction B, so that the second pushing device can be displaced substantially along the side of the vehicle 100. Furthermore, the second pushing device 150 is pivotable in relation to the first pushing device 140, in a plane spanned by the first R1 and second R2 directions, which plane may thus, but need not, be horizontal.

Hence, the first pushing device 140 is reciprocally displaceable in the first direction R1, in the embodiment illustrated in FIGS. 1a and 1b by the first pushing device 140 being in the form of a slide provided with front 141a, 141b and back 142a, 142b wheel sets, arranged to roll on a pair of rails 131a, 131b extending in the depth direction D. It will be appreciated that the first pushing device 140 may also be supported by wheels that roll directly on the ground 111.

The second pushing device 150 is displaceable in relation to the first pushing device 140 in the second direction R1, in the present embodiment by it being in the form of a slide which is supported by the first pushing device 140, and which is slidable in the width direction B. It will be appreciated that the second pushing device 150 may also be supported by another structure, such as the ground 111, on which it may for instance roll by means of wheels.

The second pushing device 150 is preferably pivotable in relation to the first pushing device 140 over an angular range T of at least 5, preferably at least 10, angular degrees in said plane spanned by directions R1, R2. The second pushing device 150 may rest freely on the first pushing device 140 or the ground 111, in order to meet these mobility requirements, but it is preferred that, as illustrated in the figures and described below, the first pushing device 140 engages with the second pushing device 150 in a manner so that the freedom of movement of the second pushing device 150 in relation to the first pushing device 140 is limited to such displacement and such pivotability.

According to the invention, the device 110 further comprises means for, in relation to the first pushing device 140, adjusting the angular position and the position in the second direction R2 of the second pushing device 150, and means for displacing the first pushing device 140 in the first direction R1 in the depth direction D towards the vehicle 100, so that the battery 160 which is supported by the second pushing device 150 is thus brought forward towards and up to the storage space 103, 106.

Such a device, with two pushing devices 140, 150 that are movable in relation one to the other, wherein the first pushing device 140 is movable in the depth direction D and the second pushing device 150 is adjustable in the angular and width B directions, achieves a very simple and hence cost effective and robust way of transporting a battery out of, away from, up to and into a storage space in a vehicle 100, parked next to the device 110. The device can be designed to work correctly even with imprecise parking and with very heavy batteries. Additionally, the device 110 can be arranged substantially or entirely above ground, since no equipment for the movement of the vehicle 100 itself is required.

It is preferred that a control device 112 is arranged to control the various actuators in the device 110 as required, in order to move the different parts in relation to each other, and is optionally also arranged to continuously monitor the state of the device 110 in a way which is conventional as such. The control device 112 may be connected to the actuators, sensors and the like in a way which is conventional per se, such as through a cable connection or wirelessly.

For example, the movement of the first pushing device 140 along the rails 131a, 131b may be driven and operated by a suitable drive device 132a, 132b, which may comprise an electric motor coupled to appropriate transmission means, such as a belt drive or the like.

It is further preferred that a control device is arranged to adjust the position in the width direction B and the angle A of the second pushing device 150 in relation to the pushing device 140.

According to a preferred embodiment, which is illustrated in FIG. 1a, the said control device comprises two pusher means, each comprising a respective electrical linear motor 144, 145 and a respective drive rod 146, 147, arranged to linearly displace, in relation to the first pushing device, each respective 153, 154 of two different points on the second pushing device 150 in a manner wherein the respective linear displacement of the two sliding bodies 144, 146; 145, 147 are substantially mutually independent. In other words, the point 153 on the second pushing device 150 is displaceable substantially independently of the point 154 on the second pushing device 150. "Substantially independently" shall herein be construed to mean that one point can be displaced a certain distance independently of if the second point is also displaced, with the result that the second pushing device 150 is rotated in relation to the first pushing device 140 if one of said points is displaced to a greater or lesser extent than the said second point. It will be appreciated that such a rotation can also lead to the points being moved in a direction perpendicular to that which is achieved using the motors 144, 145.

Hence, it is preferred that the pusher means 144, 146; 145, 147 comprise a respective electric motor 144, 145 each, which may be fixedly disposed at the first pushing device 140, and arranged to transfer a respective linear motion to a respective point 153, 154 on the second pushing device 150. It will be appreciated that the linearly displacing force may also be transmitted to the points 153, 154 in other ways, such as via a gear arrangement, using hydraulics, and so on.

It is preferred that, as illustrated in FIG. 1a, the two linear movements are directed substantially in parallel and substantially in the second direction R2.

Such an arrangement for adjusting the position of the second pushing device 150 in relation to the first pushing device 140 will cause both the width direction B and angular A position to be easily and reliably adjusted, by adjusting the respective position along the width direction B of the two points 153, 154.

A suitable engagement for the second pushing device 150 in relation to the first pushing device 140 is illustrated in FIG. 1a, and comprises a groove 143 in which a pin 151 runs along the width direction B, whereby the second pushing device 150 otherwise runs freely over the surface of the first pushing device 140, such as via a low friction contact or by means of wheels (not shown) between the first 140 and the second 150 pushing devices.

An alternative embodiment for achieving control of the second pushing device 150 in relation to the first pushing device 140 is illustrated in FIG. 1b, wherein only one linear motor 192 is shown, which via a rod 190 is arranged to linearly displace a point 155 on the second pushing device 150, preferably a journalled point 155 which represents the center of rotation as the second pushing device 150 rotates in relation to the first pushing device 140. The linear drive is then combined with a rotational drive, for example comprising an electric motor 193 arranged to rotate the second pushing device 150 in relation to the first pushing device 140 at the point 155. The groove 143 and the pin 151 are advantageously used also in this alternative embodiment, in order to control the movement of the second pushing device 150 in relation to the first pushing device 140.

According to a preferred embodiment, the transporting device 110 further comprises pushers 170, 171, arranged to push the second battery 160 from a position adjacent the storage space 103, 106, where the second battery is supported by the second pushing device 150, to a position wherein the second battery instead is supported by the vehicle 100, such as by a device connected to the storage space 103, 106, such as a door 102, 105 to storage space 103, 106. The battery 160 is preferably arranged to be able to slide over a top surface of the second pushing device 150, such as via a ball transfer surface or a material with low surface friction.

The pushers 170, 171 are preferably arranged to be able to bring the battery 160 linearly along the second pushing device 150, and may for example comprise electrically driven blocks 170, 171, guided in grooves 152a, 152b, such as is illustrated in FIGS. 1a and 1b. The blocks 170, 171 may for example comprise a respective individual electric motor each, or be driven by an individual or common electric motor which is fixedly arranged on the second pushing device 150. FIG. 3 shows one such block 170 in magnification.

FIGS. 2a and 2b illustrate, in addition to the first 140 and second 150 pushing device, also a first 180 and a second 181 pushing device in the form of slides, which may be identical to the pushing devices 140, 150. The pushing device 180 is arranged on a rail 131c similar to the rails 131a, 131b, but which comprises an angled section 131d arranged to guide the first pushing device 180 up towards a storage space 106 arranged with an opening 104 underneath, at the vehicle 100 body bottom. In FIG. 2a, a position for the first pushing device 180 is illustrated in which the battery 160 has just been handed over from a logistical device 120 (see below) to the pushing device 180. FIG. 2b illustrates a position of the pushing device 180 in which the battery 160 is in the process of being delivered to the storage space 106. As is clearly illustrated in FIG. 2b, the pusher has been activated, so that the battery 160 has been brought obliquely upwards in the direction R1, in the depth direction D, across the upper surface of the second pushing device 181 in a direction towards the opening 104, up onto the upper surface of the door 105. Once in this position, the pusher 170 can bring the battery 160 further forward, whereby an engagement means (not shown) of the vehicle 100 engages with and retains the battery 100, after which the first pushing device 180 can again be brought back to the position illustrated in FIG. 2a. It is preferred that the angled section 131d is substantially parallel to the door 105 in the folded out position of the latter, whereby the battery 160 is advanced up to and along the door 105 in a direction substantially parallel to the main plane of the door 105.

FIG. 3 illustrates the pusher 170 in closer detail, specifically, a pusher block of the pusher 170 which is arranged to push the battery (the battery is indicated by dashed lines in FIG. 3) in the depth direction D. It is preferred that the pusher 170 comprises intercepting means (in FIG. 3 exemplified using dashed surfaces formed in absorbing material, such as rubber), arranged to gently receive and support the first battery when the first battery is brought from the storage space 103, 106 to the transporting device 130. The pusher 170 also comprises an engagement member 172, arranged to be activated to engage with and retain the first battery when it is to be withdrawn from the vehicle 100 in the depth direction D.

As is illustrated by the lower pushing device pair 180, 181 in FIGS. 2a and 2b, according to a preferred embodiment the first pushing device 180 is displaceable along an at least partially angled path 131c, running in the depth direction D and also being inclined upwardly in relation to the horizontal plane from the device 110 to the vehicle 100, and which is arranged to run towards the storage space 106 in the parked vehicle 100 which has an opening 104 below the vehicle body 100. In this case, when the battery 160 is inserted into an opening 104 in an upwards rather than a sideways direction, the height position of the battery 160 must be adjusted once it has arrived at the opening 104. According to this embodiment, the transporting device 130 is arranged to perform such height adjustment of the position of the battery 160 in relation to the opening 104, when the battery 160 is moved forward by the second pushing device 181 to a position adjacent the opening 104, by adjusting the position of the first pushing device 180 along the oblique portion 131d of the path 131c, so that the battery 160 can be brought into a correct position adjacent to the opening 104 for further transfer into engagement with the vehicle 100 in connection to the storage space 106. In order to provide simultaneous adjustment of the vertical height and position in the depth direction D of the battery 160 in relation to the opening 104, it is preferred that the position of the oblique portion 131d of the path 131c is adjusted in the depth direction D, for example via the control device 132c.

The upper pushing device pair 140, 150 in FIGS. 2a and 2b illustrate an alternative embodiment, wherein the first pushing device 140 is displaceable along a substantially horizontal path 131a, which is arranged to run towards a storage space 103 in the parked vehicle 100 having an opening 101 in the side of the vehicle 100.

In this latter case, the height position of the battery 160 is adjusted by the vertical position of an attachment point of the path 131a to a logistic device 120 (see below) being adjusted, for example via the control device 132a.

In other words, the position of the battery 160 in relation to the storage space 103, 106 will be adjusted by means of the rail track 131a, 131b, 131c being adjusted in the height and/or depth direction D, by the first pushing device 140, 180 being moved along said rail path, the second pushing device 150, 181 being moved in the width direction B and rotated in relation to the first pushing device, and the battery 160 being translated in relation to the second pushing device in a direction which is substantially parallel to the depth direction D.

To allow some tolerance for malpositioning, it is preferred that a suspension of the first pushing device 140, 180 and/or a suspension of the first pushing device 140, 180 and/or a suspension of the path 131a, 131b, 131c along which the first pushing device 140, 180 is arranged to be guided, comprises spring means arranged to allow the battery 160 to move to some extent relative to the storage space 103, 106. Thereby, the battery 160 can be directed into the opening 101, 104 while any errors in the positioning of the battery 160 in relation to the opening 101, 104 are compensated for by the spring action of said spring means.

The logistics device 120 preferably communicates with both an angled path 131c and a horizontal path 131a, 131b, as illustrated in FIGS. 2a and 2b, whereby the battery 160 may be brought to a respective pushing device 140, 150 alternatively 180, 181 on either of these paths, depending on whether the opening 101, 104 is present in the side or in the bottom of the vehicle 100. The distribution of the battery 160 to the right pushing device pair may, for example, be administered using a carrying plane 123 which is vertically translatable along vertical rods 121, 122, on which the battery 160 can be transported to the correct height, and further with the help of engagement means 124 in cooperation with the battery 160, which means 124 are driven by an electrically operated control device 126 in combination with a pusher rod 125. Such a logistics device 120 is preferably connected to a storage (not shown) for discharged and charged batteries, and is preferably controlled by a central computer to automatically bring discharged batteries from pushing device pairs 140, 150; 180, 181 to a charging station in the storage, and to bring charged batteries to appropriate pushing device pairs 140, 150; 180, 181 for further transport to and into the storage spaces 103, 106 in vehicles 100. Such a combined arrangement is facilitated in the case where both the angled pushing device pair and the horizontal pushing device pair are arranged according to the invention, since the rods 121 may then be fixedly disposed.

A method for battery replacement in a vehicle 100 according to the invention thus proceeds as follows.

First, the vehicle 100 is parked next to a transporting device 130 as described above. The vehicle 100 may be parked at approximately the correct position, but the method is capable of battery replacement even for slightly erroneous or aslant parking of vehicles, even with heavy batteries. A position is detected of the storage space 103, 106 in relation to the transporting device 130, by the device, and the transporting device 130 brings the first battery out of and away from the vehicle 100. Before this, a door 102, 105 may have been opened, preferably at the command of the vehicle 100, such as via a control means which is activatable by the driver of the vehicle 100. The battery can be loosened from its position in the storage space 103, 106 by a deactivation means at the pushers 170, 171, which is arranged to cooperate with the battery 160 or the storage space 103, 106, such as by the battery being initially pressed inwards and towards the vehicle by the pushers 170, 171, which results in that an engagement between the battery and the storage space 103, 106 is released and the battery slides out from the storage space 103, 106.

Next, the transporting device brings a second, charged, battery 160 up to and into the vehicle 100 storage space 103, 106, in the above described manner, by means of a first pushing device 140 which is displaceable in the direction R1 and a second pushing device 150 which is displaceable in the direction R2, wherein the first pushing device 140 is arranged to bring with it the second pushing device 150 in the direction R1, and the second pushing device 150 in turn being arranged to support the battery 160. In the above described manner, the second pushing device 150 is preferably pivotable in relation to the first pushing device 140 over an angular range T of at least 5, preferably at least 10, angular degrees in the plane spanned by directions R1, R2.

The transporting of the first battery out and away suitably takes place by the help of the same pushing device pair 140, 150; 180, 181.

According to the invention, the second battery 160 is positioned in a position where it is supported by the second pushing device 150, 181, after which the angular- and width direction positions, in relation to the vehicle, of the second pushing device 150, 181 are adjusted, in the manner described above, by the second pushing device 150, 181 automatically being rotated and displaced in relation to the first pushing device 140, 180, and by the first pushing device 140, 180 automatically being displaced in a direction towards the vehicle 100 so that the second battery 160 is advanced towards the storage space 103, 106.

Above, preferred embodiments have been described. However, it is apparent to the skilled person that many modifications can be made to the disclosed embodiments without departing from the basic idea of the invention.

For example, the above-described electric motors that drive the various moving parts of the device 110 may be designed in many different ways which are in themselves conventional within the field of automation, such as by direct electric power via electric stepping motors or the like; by indirect electrical power through belt, chain or gear arrangements; or by hydraulic power.

The above described slides, provided with wheels or sliding surfaces, may have other mechanisms for being displaced in the directions R1 and R2. Examples include endless conveyor belts.

It is further understood that the details of the engagement of the battery with the vehicle, the handover between vehicle and transporting device, the logistics device, and so on, may vary.

Thus, the invention is not to be limited to the embodiments described, but can be varied within the scope of the enclosed claims.

The invention claimed is:

1. A device (110) for battery replacement in a vehicle (100), which vehicle (100) is arranged with a storage space (103,106) arranged to receive and accommodate a battery (160) for use in movement operation of the vehicle (100), the device (110) comprising:

a transporting device (130) arranged at least partially above ground, the transporting device (130) arranged for automatic transport of a first battery out of and away from the storage space (103,106) and for the automatic transport of a second battery (160) up to and into the storage space (103,106), wherein the transporting device (130) is associated with a horizontal width direction (B), substantially parallel to the parked vehicle's (100) longitudinal direction, and a horizontal depth direction (D), which is perpendicular to the width direction (B), wherein the device (110) is arranged to sense a position for the storage space (103,106) in relation to the transporting device (130), wherein the transporting device (130) comprises a first pushing device (140,180), the first pushing device (140,180) being displaceable in a first direction (R1), and a second pushing device (150,181), the second pushing device (150,181) being displaceable in a second direction (R2), wherein said first pushing device (140,180) is arranged, when displaced in the first direction (R1), to also bring the second pushing device (150,181) in the first direction (R1), and wherein the second pushing device (150,181) is arranged to support the second battery (160), wherein a horizontal projection of the first direction (R1) is parallel to the depth direction (D), a horizontal projection of the second direction (R2) is parallel to the width direction (B), wherein the second pushing device (150,181) is pivotable in relation to the first pushing device (140,180) in a plane spanned by the first (R1) and second (R2) directions; and means (144-147;190,192,193) for adjusting an angular position of the second pushing device (150,181) and a position of the second pushing device (150,181) in the second direction (R2), in relation to the first pushing device (140,180), and means (132a,132b,132c) for displacing the first pushing device (140,180) in the first direction (R1) towards the vehicle (100), so that the second battery (160) which is supported by the second pushing device (150,181) thereby is brought to the storage space (103,106).

2. The device (110) according to claim 1, wherein the transporting device (130) comprises a control device (144-147;190,192,193) for adjusting the position in the second direction (R2) of the second pushing device (150,181) and an of the second pushing device (150,181) angle in relation to the first pushing device (140,180).

3. The device (110) according to claim 2, wherein the control device comprises two pushers (144-147), arranged to linearly displace two different points (153,154) on the second pushing device (150,181) in relation to the first pushing device (140,180), wherein the respective size of the respective linear displacement of the two pushers (144-147) are substantially mutually independent.

4. The device (110) according to claim 3, wherein the two pushers (144-147) comprise two electric motors (144,145), arranged to transfer a respective linear motion to a respective point (153,154) each on the second pushing device (150,181).

5. The device (110) according to claim 4, wherein the two linear motions are directed parallel and along the second direction (R2).

6. The device (110) according to claim 4, wherein the transporting device (130) also comprises pushers (170,171), arranged to push the second battery (160) from a position adjacent to the storage space (103,106), in which the second battery (160) is supported by the second pushing device (150,181), to a position in which the second battery (160) is instead supported by the vehicle (100).

7. The device (110) according to claim 3, wherein the transporting device (130) also comprises additional pushers (170,171), arranged to push the second battery (160) from a position adjacent to the storage space (103,106), in which the second battery (160) is supported by the second pushing device (150,181), to a position in which the second battery (160) is instead supported by the vehicle (100).

8. The device (110) according to claim 2, wherein the transporting device (130) also comprises pushers (170,171), arranged to push the second battery (160) from a position adjacent to the storage space (103,106), in which the second battery (160) is supported by the second pushing device (150,181), to a position in which the second battery (160) is instead supported by the vehicle (100).

9. The device (110) according to claim 2, wherein the first pushing device (180) is translatable along an oblique path (131c), running in the depth direction (D) and which also is angled upwards in relation to the horizontal plane from the device (110) towards the vehicle (100), and which is arranged to run towards a storage space (106) in the parked vehicle (100) that has an opening (104) under the vehicle (100) body, and when the second battery (160) is brought forward by the second pushing device (181) to a position adjacent to the said opening (104), the transporting device (130) is arranged to adjust the height position of the second battery (160) in relation to the opening (104) by adjusting the position of the first pushing device (180) along the oblique path (131c) so that the second battery (160) can be brought forward to the correct position adjacent to the opening (104).

10. The device (110) according to claim 1, wherein the transporting device (130) also comprises pushers (170,171), arranged to push the second battery (160) from a position adjacent to the storage space (103,106), in which the second battery (160) is supported by the second pushing device (150,181), to a position in which the second battery (160) is instead supported by the vehicle (100).

11. The device (110) according to claim 10, wherein the pushers (170,171) comprise intercepting elements, arranged to receive and support the first battery when the first battery is brought from the storage space (103,106) to the transporting device (130).

12. The device (110) according to claim 1, wherein the first pushing device (180) is translatable along an oblique path (131c), running in the depth direction (D) and which also is angled upwards in relation to the horizontal plane from the device (110) towards the vehicle (100), and which is arranged to run towards a storage space (106) in the parked vehicle (100) that has an opening (104) under the vehicle (100) body, and when the second battery (160) is brought forward by the second pushing device (181) to a position adjacent to the said opening (104), the transporting device (130) is arranged to adjust the height position of the second battery (160) in relation to the opening (104) by adjusting the position of the first pushing device (180) along the oblique path (131c) so that the second battery (160) can be brought forward to the correct position adjacent to the opening (104).

13. The device (110) according to claim 1, wherein the first pushing device (140) is translatable along a horizontal path (131a,131b), arranged to run towards the storage space (103) in the parked vehicle (100) and having an opening (101) in the side of the vehicle.

14. The device (110) according to claim 1, wherein a suspension of the first pushing device (140,180) and/or a suspension of a path (131a,131b,131c,131d) along which the first pushing device (140,180) is arranged to be brought allows the second battery (160) to move to a certain extent in relation to the storage space (103,106), so that the second battery (160) can be controlled into an opening (101,104) and into the storage space (103,106) while any errors in the positioning of the second battery (160) in relation to the opening (101,104) are compensated for by spring action.

15. A method for battery replacement in a vehicle (100), which vehicle (100) is arranged with a storage space (103, 106) for a battery (160), whereby a battery installed in the storage space (103,106) is arranged for use in movement operation of the vehicle (100), wherein the method comprises following steps:
  a) parking the vehicle (100) next to a device (11) comprised of a transporting device (130) arranged at least partially above ground, the transporting device (130) being arranged for automatic transport of a first battery out of and away from the storage space (103,106) of the vehicle (100), the transporting device (130) being associated with a horizontal width direction (B), substantially parallel to the parked vehicle's (100) longitudinal direction, and a horizontal depth direction (D), which is perpendicular to the width direction (B);
  b) sensing a position for the storage space (103,106) in relation to the transporting device (130), the sensing being performed by the device (110);
  c) causing the transporting device (130) to bring the first battery out of and away from the vehicle (110); and
  d) causing the transporting device (130) to bring a second battery (160) up to and into the storage space (103,106) of the vehicle (100);
  wherein a first pushing device (140,180) in the transporting device (130) is arranged to be displaceable in a first direction (R1), a second pushing device (150,181) in the transporting device (130) is arranged to be displaceable in a second direction (R2), the said first pushing device (140,180) is arranged, when displaced in the first direction (R1), to bring the second pushing device (150,181) in the first direction (R1), and the second pushing device (150,181) is arranged to support the second battery (160),
  wherein a horizontal projection of the first direction (R1) is parallel to the depth direction (D), a horizontal projection of the second direction (R2) is parallel to the width direction (B), the second pushing device (150, 181) is pivotable in relation to the first pushing device (140,180) in a plane spanned by the first (R1) and second (R2) directions, and in said step d), the following substeps are performed:
    d1) positioning the second battery (160) in a position in which the second battery is supported by the second pushing device (150,181);
    d2) adjusting an angular position and a position in the second direction (R2), in relation to the vehicle (100), of the second pushing device (150,181) by the second pushing device (150,181) being automatically pivoted and displaced in relation to the first pushing device (140,180); and
    d3) automatically displacing the first pushing device (140,180) in the first direction (R1), towards the vehicle (100), so that the second battery (160) is brought up to the storage space (103,106).

16. The method according to claim 15, wherein the position in the second direction (R2) and the angle in relation to the first pushing device (150,181) of the second pushing device (140,180) is adjusted using two pushers (144-147) in the transporting device (130), arranged to linearly displace two different points (153,154) on the second pushing device (150,181) in relation to the first pushing device (140,180), wherein the respective size of the respective linear displacement of the two pushers (144-147) are substantially mutually independent.

17. The method according to claim 16, comprising the further step of causing two electric motors (144,145) of the pushers to transmit a respective linear motion to one respective point (153,154) each on the second pushing device (150,181).

18. The method according to claim 15, comprising the further step of using pushers (170,171) in the transporting device (130) to push the second battery (160) from a position adjacent to the storage space (103,106), where the second battery (160) is supported by the second pushing device (150,181), to a position wherein the second battery (160) is instead supported by the vehicle (100).

19. The method according to claim 18, comprising the further step of causing intercepting elements of the pushers (170,171) to receive and support the first battery (160) when the first battery (160) is brought from the storage space (103,106) to the transporting device (130).

20. A device (110) for battery replacement in a vehicle (100) with a storage space (103,106) arranged to receive and accommodate a battery (160) for use in movement operation of the vehicle (100), the device (110) comprising:
  a transporting device (130) arranged at least partially above ground, the transporting device (130) arranged for automatic transport of a first battery out of and away from the storage space (103,106) and for the automatic transport of a second battery (160) up to and into the storage space (103,106),
  wherein the transporting device (130) is associated with a horizontal width direction (B), parallel to the parked vehicle's (100) longitudinal direction, and a horizontal depth direction (D), which is perpendicular to the width direction (B),
  wherein the device (110) is arranged to sense a position for the storage space (103,106) in relation to the transporting device (130),
  wherein the transporting device (130) comprises a first pushing device (140,180) displaceable in a first direction (R1), and a second pushing device (150,181) displaceable in a second direction (R2), the second pushing device (150,181) being arranged to support the second battery (160),
  wherein said first pushing device (140,180) is arranged, when displaced in the first direction (R1), to also bring the second pushing device (150,181) in the first direction (R1),
  wherein a horizontal projection of the first direction (R1) is parallel to the depth direction (D), a horizontal projection of the second direction (R2) is parallel to the width direction (B),
  wherein the second pushing device (150,181) is pivotable in relation to the first pushing device (140,180) in a plane spanned by the first (R1) and second (R2) directions; and
  an angular position adjusting unit (144-147;190,192,193) that adjusts an angular position of the second pushing device (150,181) and a position of the second pushing device (150,181) in the second direction (R2), in relation to the first pushing device (140,180), and a displacing unit (132*a*,132*b*,132*c*) that displaces the first pushing device (140,180) in the first direction (R1) towards the vehicle (100), so that the second battery (160), which is supported by the second pushing device (150,181), is brought to the storage space (103,106).

* * * * *